April 15, 1969 E. W. LEHTONEN 3,438,127

MANUFACTURE OF CIRCUIT MODULES USING ETCHED MOLDS

Filed Oct. 21, 1965

EDWIN W. LEHTONEN
INVENTOR.

MANUFACTURE OF CIRCUIT MODULES USING ETCHED MOLDS

April 15, 1969 E. W. LEHTONEN 3,438,127

MANUFACTURE OF CIRCUIT MODULES USING ETCHED MOLDS

Filed Oct. 21, 1965 Sheet 8 of 9

United States Patent Office 3,438,127
Patented Apr. 15, 1969

3,438,127
MANUFACTURE OF CIRCUIT MODULES USING ETCHED MOLDS
Edwin W. Lehtonen, Castro Valley, Calif., assignor to Friden, Inc., a corporation of Delaware
Continuation-in-part of application Ser. No. 481,601, Aug. 23, 1965. This application Oct. 21, 1965, Ser. No. 499,412
Int. Cl. B41m 3/08; H05k 3/20
U.S. Cl. 29—625 7 Claims

ABSTRACT OF THE DISCLOSURE

A mold plate for a circuit board is etched by techniques of the printing art through a layer of photo-resist developed from a half-tone image of the conductor pattern to form raised projections on conductor areas of the mold. Controlled etching relieves the nonconductor areas. An insulating board, cast in such mold, has cavities corresponding to the conductor areas and closely spaced recesses in the bottoms of those cavities, corresponding to the projections. The board is plated all over with metal and then ground off to leave metal in the conductor cavities with integral anchors extending into closely spaced recesses. Cores in the mold for producing holes through the molded board are produced by initial etching, and then the conductor pattern is applied in photo-resist by contact printing through a photo-transparency having holes to fit the cores. Photo-resist areas for forming core pads are photographically superimposed on half-tone patterns by second exposures. An anchored contact near the edge of the board is formed in a deep hole with overhanging sides for providing extra thickness and for keying the contact to the board. A thin conductor layer applied to the conductor cavity and closely spaced recess therein, lines but does not fill the recesses, so that if the planar part of the conductor is severed, as by expansion of the insulating board, the metal lining the recesses will be only partially torn and so will maintain conductive continuity.

FIELD OF THE INVENTION

The present invention relates to electric circuit boards and is a continuation-in-part of my prior copending application, Ser. No. 481,601, filed Aug. 23, 1965, and now abandoned.

DESCRIPTION OF THE PRIOR ART

A circuit board, sometimes called a "printed circuit," includes an insulating board with conductors thereon, usually thin and adhering to the board. Wide commercial use points to the photo-resist methods as the better of the prior art processes for making such boards. In one such process, an insulating board with an adherent metal foil is covered with a coating that, upon photographic exposure and development, becomes etch resistant in the pattern of the circuit conductors. An etching solution is applied for removing the unwanted metal foil. Then a solvent removes the "resist." If desired, additional metal may be plated onto the remaining metal foil. Components, such as transistors, diodes, resistors, and capacitors, may be mounted on the board and connected to the foil conductors. One or more of such assembled boards may constitute a module.

Heretofore, the conductors on such boards have been fragile and have had weak bonds to the boards so that they were easily loosened during assembly, use, and other handling of the boards and modules. In this situation, resistors, capacitors, etc., could not be supported only by their fastening to the conductors, but needed independent mechanical support from the base.

SUMMARY OF THE INVENTION

My present invention provides an improved base and an improved base-and-conductor assembly for a circuit module. My construction is cheaper and stronger, and provides a firmer fastening of the metal to the base. The base is constructed of resilient, moldable plastic material, and the conductors are well bonded and keyed thereto. My device will withstand the rough handling required in manufacturing and in use, and the high temperatures required for soldering.

My present invention provides an improved method for making circuit boards by the molding of an insulating base, by overall metal plating, and by grinding off, machining off, or otherwise removing excess metal. The method is fast and inexpensive, and provides a uniform product.

My invention provides an improved circuit board, or module, having conductors keyed to an insulating base, an improved base therefor having overhanging sides and other keying structures for holding the conductors securely thereon. It provides a conductor with convolutions that both key it to a base and also render it expandable for relieving stress while maintaining circuit continuity. My invention provides an improved, fast, low-cost process for making a mold for such a base, wherein core and circuit patterns are transferred photographically to a photo-resist on a mold plate blank, which is selectively and progressively etched to produce the mold cavity plate.

Objects of my invention include the provision of an improved process for the manufacture of a mold for a circuit board, or the like, an improved process for assembling a circuit board with conductors thereon and an improved construction for circuit modules.

DESCRIPTION

These and other objects and advantages of my invention will be apparent from the following description of certain specific embodiments thereof, taken in connection with the accompanying drawings, wherein.

Figure 18:
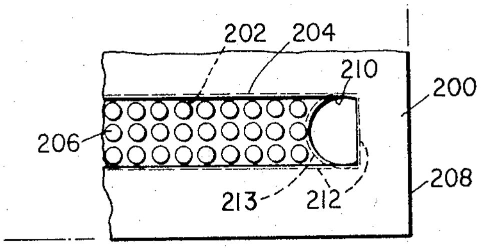
FIG. 18 is a fragmentary view of an insulating base for a circuit module of another construction.
Figure 19:
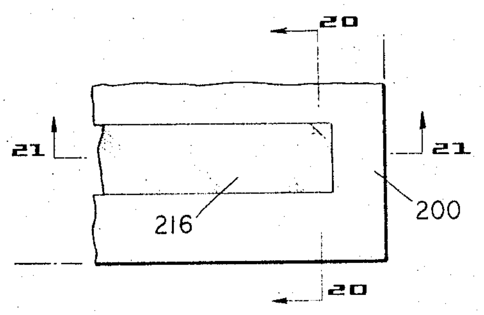
Figure 20:
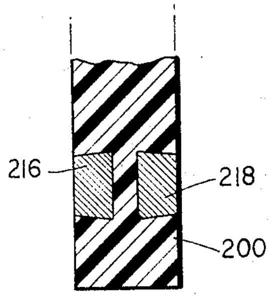
Figure 21:
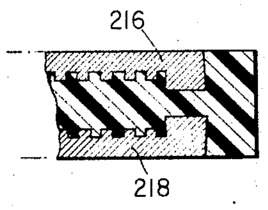
Figure 22:
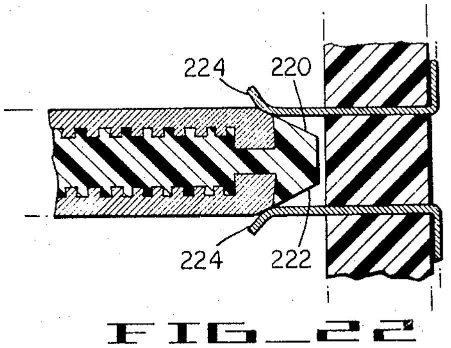
Figure 23:
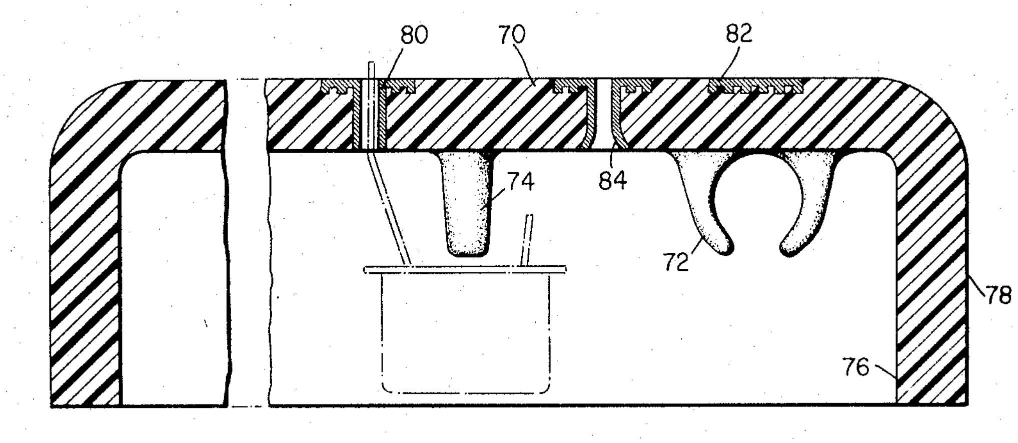
Figure 24:
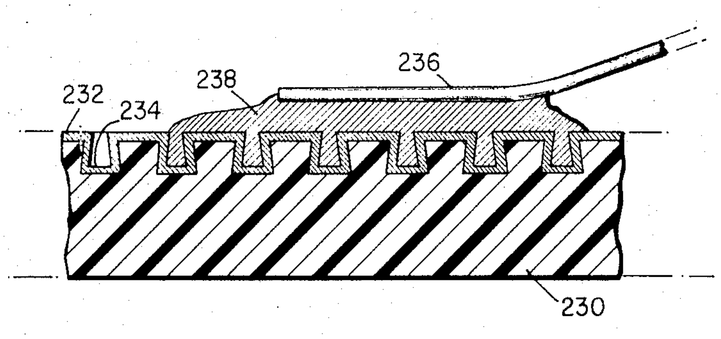
Figure 25:
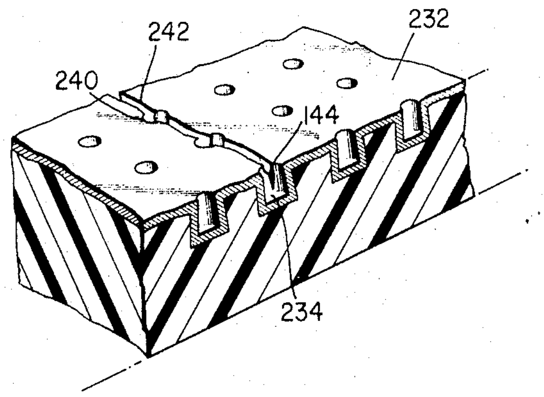

FIGS. 19, 20 and 21 are fragmentary views showing the base of FIG. 18 with a circuit conductor thereon. FIGS. 20 and 21 are sections taken along the lines 20—20 and 21—21, respectively, in FIG. 19;

FIG. 22 is a partial sectional view showing the circuit board of FIGS. 19, 20 and 21 in engagement with a circuit-making receptacle;

FIG. 23 is an elevational section of a module base of a different form for illustrating the versatility, and for the usefulness of my invention; and FIGS. 24 and 25 are fragmentary views of a modified construction for further illustrating the versatility and usefulness of my invention.

In all views the sizes of certain parts and spacings are exaggerated for facilitating the disclosure.

Figure 1:
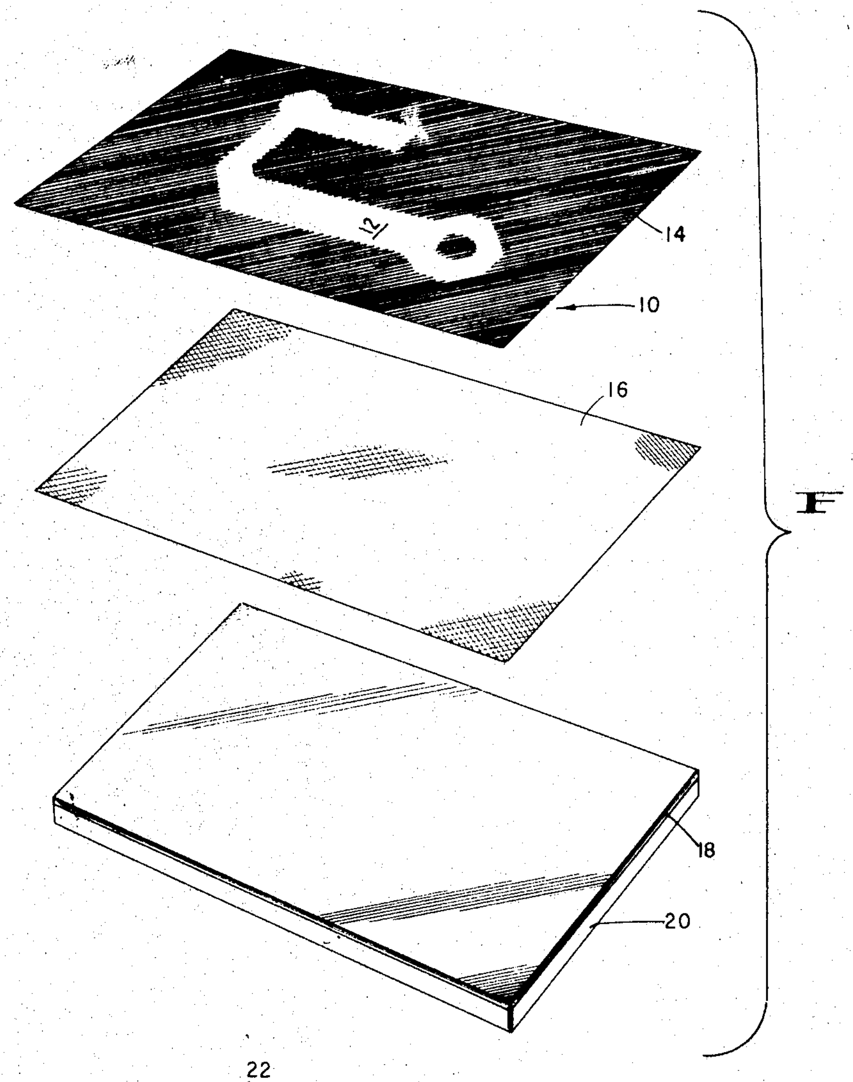
FIG. 1 is an exploded perspective view of a setup for photographically printing a pattern on a mold plate blank for etching.
Figure 2:
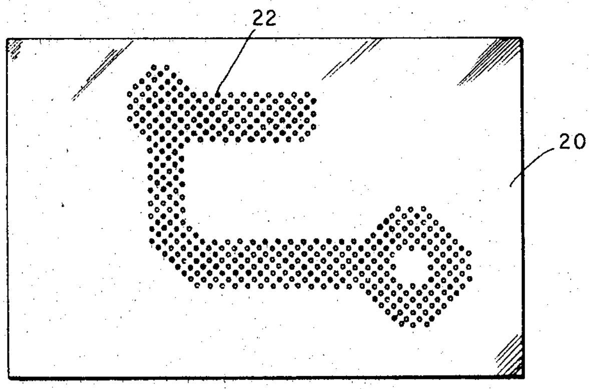
FIG. 2 is a plan view of the pattern produced by the setup of FIG. 1.

In FIG. 1, a photographic image of a circuit pattern on a film 10 includes a transparent image 12 of the conductor portion, and a less transparent, preferably opaque, image 14 of the nonconducting or background portion of the circuit pattern. For simplifying the drawings, only a single conductor area 12 is shown. The film 10 is laid over a half-tone screen 16, well-known in the printing art, and the two are laid over a photo-resist coating 18 on a metal mold plate blank 20. Alternatively, the half-tone pattern can be included in the photographic image 12. The assembly is then exposed to a strong light. The greatest exposure will occur in dots produced by light that passes through the more transparent conductor image 12 and also through the openings of the half-tone screen 16. This image of dots on the coating 18 is then hardened, as, for example, by heating, and the unexposed portion of the layer 18 is removed, as by chemical washing. The etch-resist material 18 will then remain only in a pattern of closely spaced dots 22, as shown in FIG. 2. The dots 22 are shown oversize in FIG. 2.

The half-tone screen 16 may, for example, produce dots about .005 inch in diameter spaced about .010 inch on centers. Several photo-resist materials and developers therefor are known, some of which are identified only by proprietary names.

Figure 3:
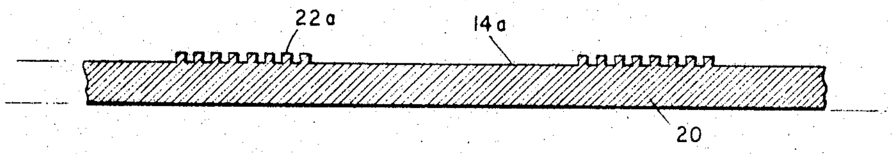
FIGS. 3, 4 and 5 illustrate successive steps in the process of etching a mold plate blank for producing a mold-cavity plate.

The plate 20 is next etched by techniques known to the photoengraving art. A first etching operation is controlled to remove about .005 inch of metal from the background and from the area between the dots. This first etching operation is carried out with a strong etching solution so that it will undercut the dotted areas somewhat as shown in FIG. 3. Each dot 22 of resist material thus causes a small individual projection **22*a*** to be formed that is larger in cross-section at its outer end, corresponding to the original surface of the plate, than at its root portion.

Figure 4:
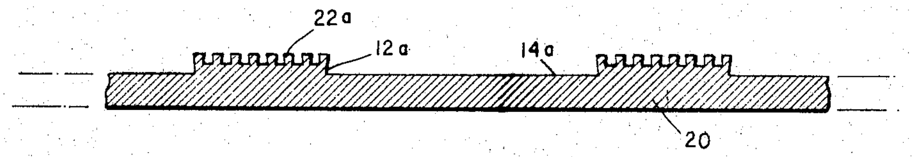

With the mold plate in the form shown in FIG. 3, an etch resist material in powdered form, known to the photo-engraving trade as "Dragon's Blood," is spread onto the plate and brushed in so that the resist material thoroughly covers the conductor area including the projecting dots **22*a* and the flanks thereof. The brushing removes the powder from the smooth, background portions 14*a* of the plate. A strong etching solution is applied to the plate for removing a layer of the background 14*a* and leaving the conductor area 12*a*, FIG. 4, as a plateau, or land, covered with the pattern of closely spaced projections 22*a***, as shown in FIG. 4.

Figure 5:
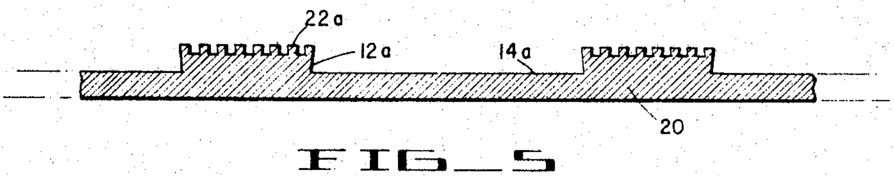
Figure 6:
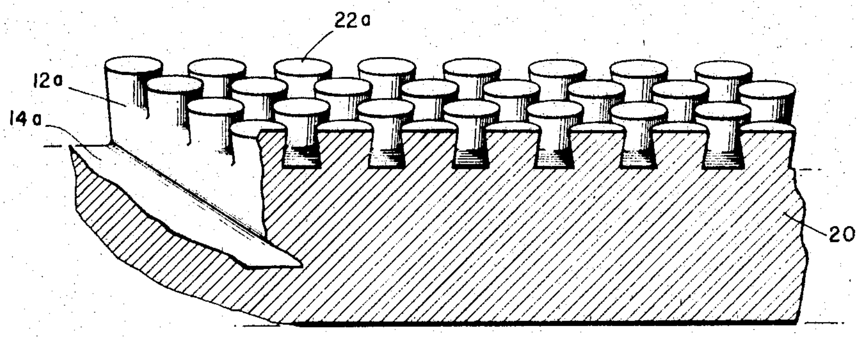
FIG. 6 is an enlarged partial perspective view of the mold-cavity plate of FIG. 5.

The strong etching solution has a desirable and controllable tendency to undercut the conductor areas **12*a*. To control this undercutting tendency, the etching is carried out in several steps, each step removing only a thin layer of metal. To that end, additional "Dragon's Blood" is brushed onto the plate shown in FIG. 4 for renewing the protection to the conductor area 12*a* and for also seating the "Dragon's Blood" against the flanks of the projecting plateaus, or lands, 12*a*, which constitute the conductor area. The plate is then additionally etched with a strong solution to remove another thin layer of metal from the background 14*a***. The steps of applying additional "Dragon's Blood" and etching off thin layers can be repeated until the desired thickness, for example, .010 to .020 inch, of metal has been removed. In general, a strong etching solution produces sharp corners and tends strongly to undercut the protected areas. A weak solution tends to do no undercutting and may give the projection an out-sloping flank. I prefer to use a strong solution and to reduce the degree of undercutting by repeated application of "Dragon's Blood." The final mold-cavity plate will appear as in FIGS. 5 and 6. The projections **22*a* and their spacing, and the thickness of metal removed by etching, are exaggerated in FIGS. 3 to 6. The dots 22 in FIG. 2 and the projections 22*a* in FIG. 6 are shown round in plan, but the half-tone image may cause them to be somewhat square. The shape as seen in a section parallel to plate 20** (horizontal in the drawings) is immaterial.

The mold-plate blank 20 may consist of copper, steel, or any of various other metals, depending on the service required of the finished mold-cavity plate. For example, the strength needed in the metal will depend on the characteristics of the particular plastic that is to be molded, on the size of the projections **22*a*** (FIGS. 5 and 6), and on the extent of undercutting. The finished plate may be chromium plated for increasing its life.

Figure 7:
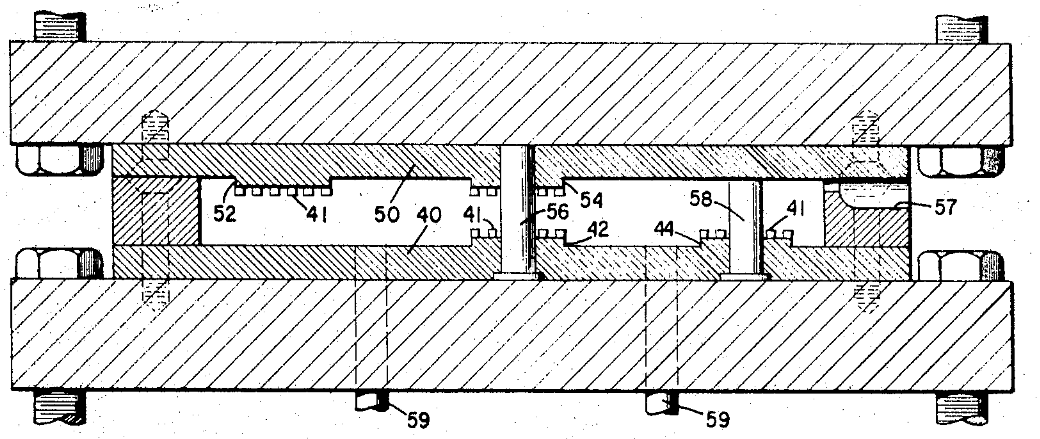
FIG. 7 is an elevational section of a mold employing mold-cavity plates similar to that shown in FIG. 5 for making circuit board blanks by injection molding.

FIG. 7 shows a mold for a circuit board. As shown, the mold is for injection molding, but other molding methods may be used. A lower mold-cavity plate 40 having lands 42 and 44, each with small projections 41 thereon, may be constructed as described in connection with FIGS. 1 to 6. A similarly constructed, upper, mold-cavity plate 50 has lands 52 and 54, each with projections 41, land 54 being opposite the land 42 of plate 40. Thus, the face of the mold cavity includes the etched, or prepared, surfaces of plates 40 and 50. A pin, or core, 56 is fastened in a hole in land 42 of the lower plate and aligned with a similar hole in land 54 of the upper plate. A similar pin, or core, 58 is fastened in a hole in the land 44 and abuts the surface of the upper plate 50. The lands 42, 44, 52 and 54, shown in cross-section, may be elongate for conductors, for example, like the conductor represented by the image 12 in FIG. 1, or alternatively, one or more such lands may be button-like for making small depressions in the molded boards, for forming anchors. The mold may include a runner and gate 57 and also ejector pins 59.

Figure 8:
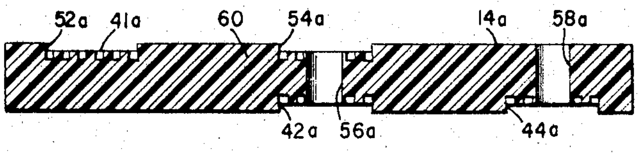
FIG. 8 is an elevational section of an insulating, circuit board base made in the mold of FIG. 7.

With a mold such as shown in FIG. 7, circuit boards may be molded of suitable plastic insulating material. FIG. 8 shows an integral board 60 made from the mold of FIG. 7. The board, or monoblock, may be molded of a moldable plastic material that is sufficiently tough, resilient and yieldable that the overhanging sides of the depressions **42*a*, 44*a*, 52*a* and 54*a* shown in FIG. 8 can strip from the lands 42, etc., of the mold and so that the overhanging sides of the small holes 41*a* can strip or "pop" from the dot-like projections 41 of the mold, FIG. 7, all without rupturing or permanently deforming the molded board. The stripping is aided by the slight shrinkage that the board exhibits as it cools. Plastic materials have a property, sometimes called "elastic memory," of recovering slowly from nonrupturing deformations. Preferably the plastic material of the board 60** should withstand the high temperatures required for soldering operations, should have a high electric resistivity, should have good strength and durability, and should receive and adhere to plated metal coatings.

One suitable material is polysulfone, a clear, amber colored, thermoplastic, molding material recently offered by Union Carbide Corporation, 270 Park Ave., New York, N.Y. This material is described as having a molecular structure which includes recurring benzine rings with three linking units, namely, as isopropylidene group, an ether linkage, and a sulfone group. Another suitable material is polyphenylene oxide (also called PPO). This is a light colored, thermoplastic, molding material recently offered by General Electric Co., 1 Plastics Ave., Pittsfield, Mass. Both of these materials can be injection molded. They exhibit good resilience when taken from the mold, so that parts having undercuts, or negative draft, strip from the mold satisfactorily. They are nonbrittle and can be machined easily. They show high electric resistance, low water absorption and good impact strength. They retain their strength, form and mechanical stability at higher temperatures than do most moldable plastic materials, and withstand the temperatures to which they are exposed in dip, wave and hand soldering of electric circuit boards. These materials can be plated with metal by procedures that are generally similar to those well-known and widely used for the plating of metal on plastic.

Although several plating processes are known and can be used with my invention, I prefer electroplating. Preliminary to electroplating, each of these materials, polysulfone and PPO, may be treated to improve the bond that the metal will make to the plastic surface, to make the plastic receptive to the metal, and to establish an initial conductive coating. Although my invention provides an improved mechanical fastening for the conductors, it is advantageous to obtain a good bond too.

The best treatment appears to be special to each material, and I may employ the steps suggested by the respective suppliers hereinbefore identified. For polysulfone, the molded plastic blank, such as the board 60, FIG. 8, is annealed at 170° C. (about 340° F.) for four hours, and then wiped clean with isopropanol. It is next etched at room temperature for ten minutes in a 105% solution of fuming sulphuric acid (20% free $SO_3$) after which it is transferred quickly to immersion in cold tap water. Next, the Enthone process may be used. This is a proprietary process, the reagents for which are sold by Enthone Inc., 442 Elm St., New Haven, Conn. This process includes immersion for two to four minutes in a silicated alkaline cleaner, immersion for one minute in an acid salt neutralizer, immersion for one minute in a liquid polymer solution, sensitization by immersion for one minute in a solution of stannous chloride and hydrochloric acid, activation by immersion for one minute in a solution of palladium chloride, and immersion in an electroless-plating (not electrolytic) copper solution.

For PPO, the molded blank is vapor-blasted (blasted with water and sand entrained in air) with 250 to 400 mesh grit, brushed in 3% sodium carbonate solution, cleaned thoroughly in cold running water, chemically (not electrolytically) etched for one minute at 130° to 140° F. in a solution having the proportions, 75 grams chromium trioxide and 250 cc. of concentrated (96%) sulphuric acid in 270 cc. of water, and cleaned in water. Then it may be sensitized, activated and immersed in an electroless plating bath similarly to those steps described above for polysulfone.

Alternatively, the polysulfone, the PPO, and various other molded plastics may be prepared for electroplating by treatment with a proprietary material offered by Shipley Company, Inc., 2300 Washington St., Newton, Mass., under the name "Adhesive 200TF." The supplier describes it as "a thermal-setting, partially thermoplastic, buna type, Hycar adhesive." The supplier also offers a methyl isobutyl ketone thinner, a stannous chloride sensitizer, a palladium chloride accelerator, and a formaldehyde type, electroless, copper solution under proprietary names for use with the adhesive. The molded board may be cleaned with the thinner and dried. The adhesive, mixed with thinner, is applied by spraying or dipping to provide a dry-film coating .0008 to .0015 inch thick. It is air dried until no longer tacky, partially cured at 180° to 200° F. for twenty to twenty-five minutes, immersed in the catalyst for three to six minutes, rinsed in clean water, immersed in the accelerator for ten minutes, again rinsed in water, immersed in the copper solution for six to twelve minutes for receiving a coat of electrolessly deposited copper, rinsed again, and given a final cure at 180° to 200° F. The total time of the semi and final rinses should be forty-five minutes.

Figure 9:
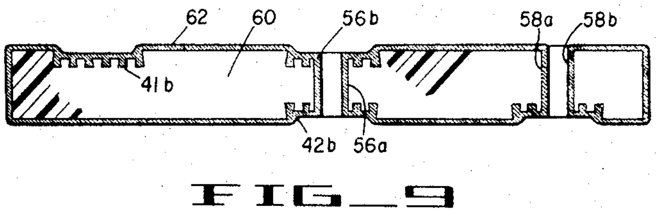
FIG. 9 is a similar view showing the board of FIG. 8 after plating.
Figure 10:
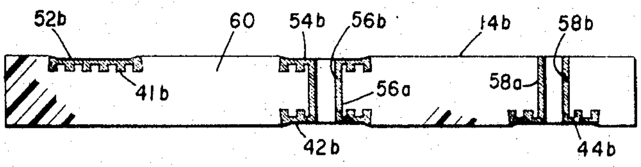
FIG. 10 is a similar view showing the board of FIG. 9 after the outer surface, including the excess metal, has been removed.

The circuit board 60 of FIG. 8 may be electroplated overall by known techniques or, if preferred, certain areas may be treated with wax or other antiplating material for resisting the plating operation. Preferably any such antiplating material is applied before the immersion in the electroless plating bath as described above. FIG. 9 shows the board 60 plated overall with an integral coat 62 of copper, although other metals may be used. The plated metal includes projections **41*b*, FIG. 9, lining or filling the holes 41*a* of the board 60, FIG. 8, and constituting replicas of the projections 41 in the mold of FIG. 7. It includes also conductor portions 42*b*, etc., FIG. 9, and sleeves 56*b* and 58*b* lining the holes 56*a* and 58*a*. For many purposes, a coating of .002 inch will be satisfactory, but a greater thickness may be applied. For example, if the holes 41*a*, FIG. 8, in the board are about .005 inch in diameter and the plating is .002 inch or more in thickness, the holes will be substantially filled. After the plating operation, the board is machined off to a plane surface, as by grinding, for removing the excess metal and exposing the plastic board 60 in the so-called background areas 14*b*, FIG. 10, but leaving the plated metal 52*b***, etc., in the channels and depressions, that is, in the conductor areas of the board. As shown in FIG 10, the thickness of the metal plated in the conductor channels may be less than the depth of those channels so that the surfaces of the conductors are recessed.

Figure 11:
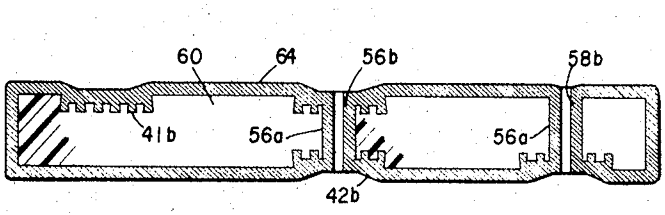
FIGS. 11 and 12 are views similar to FIGS. 9 and 10, but showing the board with a thicker metal coating.
Figure 12:
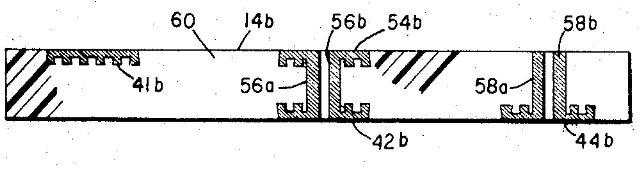

As shown in FIG. 11, the board 60 may be plated with a thicker layer of metal 64 so that when the plated board is cut down to a plane surface, for removing the metal and exposing the plastic surface in the background areas **14*b*, FIG. 12, the metal in the conductor channels 42*a***, etc., will be flush with the plastic surface.

The plated metal extends at **41*b*, FIGS. 10 and 12, into the small cavities 41*a* in the bottom of the channels 42*a*, etc., FIG. 8, for keying the conductor to the surface of the board. The small cavities 41*a* are formed by the undercut dot projections 41, FIG. 7, in the mold and so have narrow necks. The plated metal enters, and lines or fills these cavities 41*a*, and is continuous with the rest of the metal within the conductor channel, such as 42*b***, FIG. 9, and so keys the conductor in the channel. The metal conductor is further keyed in place by the converging, or overhanging sidewalls of the channel.

As shown in FIGS. 9 to 12, the metal also plates the surface of the plastic board 60 within the molded holes **56*a*, and 58*a*, FIG. 8, so that the metal within each hole is continuous and coherent from one face of the board to the other. Thus the metal 56*b*, FIGS. 10 and 12, in the hole 56*a*, FIG. 8, is integral, and firmly bonded, with the conductors 54*b* and 42*b* in the cavities 54*a* and 42*a***, and so provides an additional fastening for securely holding the metal conductors in place.

Where a hole is required through the board, as for access to a conductor, as at 80 in FIG. 23, a hole, such as **58*a*, FIG. 8, molded in the base 60 will plate through, as at 58*b*, FIGS. 9 and 10. Even though the plated sleeve 58*b* may not by itself key the conductor to the base, it does provide a firm, socket-like anchorage that helps the conductor support the mechanical load of condensers, transistors, etc., that are fastened to it. The adherence of the metal to the wall of the bore 58*a*, independently of any keying action, materially helps to hold the conductor 44*b* in place on the base. Alternatively, a part of the hole may be tapered, so that the plated sleeve anchors the conductor as at 84** in FIG. 23.

In FIGS. 7 to 12, as in FIGS. 1 to 6, the size of the projections 41, **41*b*, etc., the height of the lands 42, 52, etc., the size of the holes 56*a* and 58*a***, and the thickness of the plated metal, and other similar features, are exaggerated to aid the disclosure.

Figure 13:
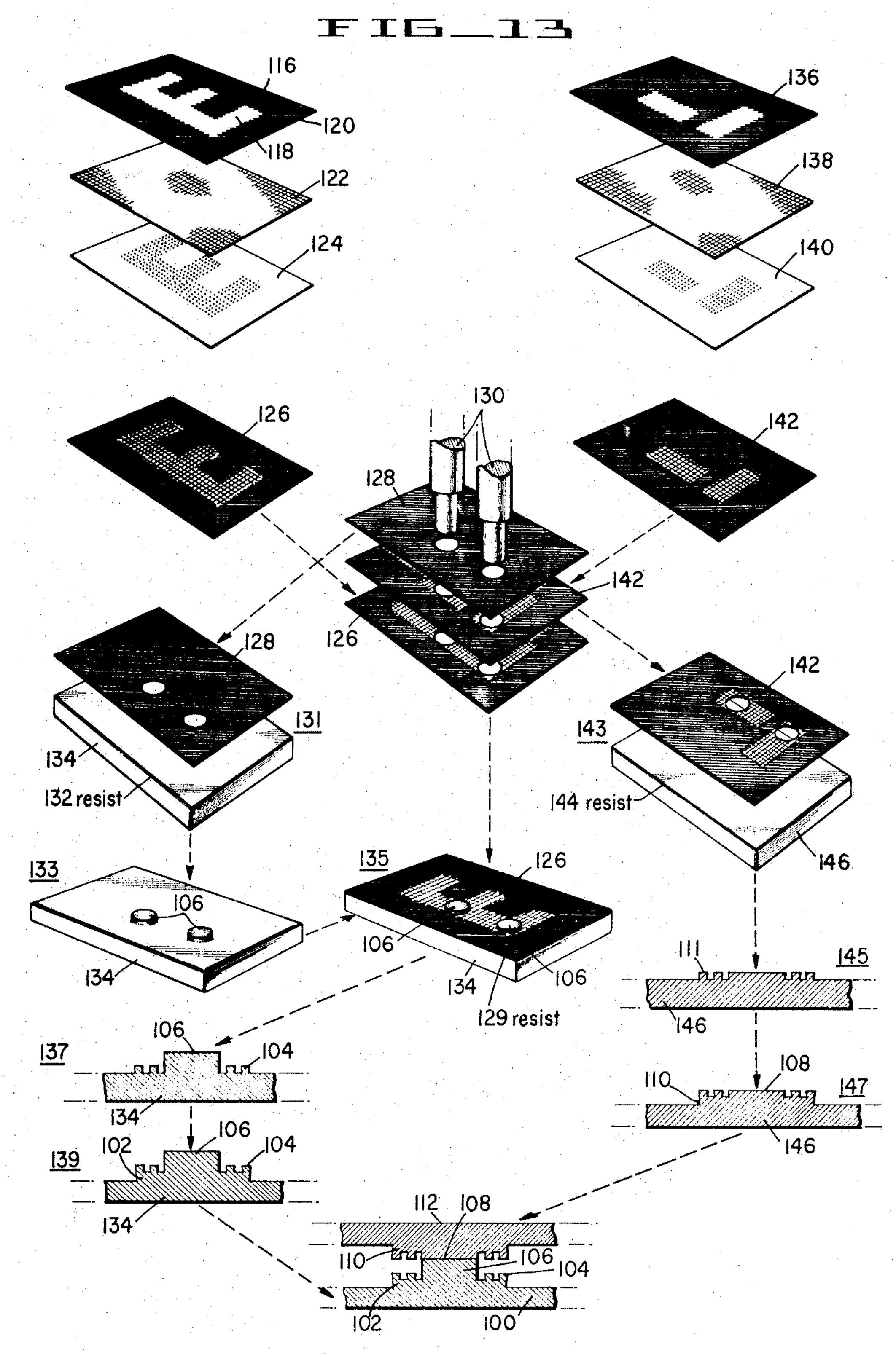
FIGS. 13, 14, 15 and 16 are pictorial diagrams depicting the steps of making mold-cavity plates with cores for circuit board bases, and showing some details of the structures produced thereby.

In the mold of FIG. 7, pins 56 and 58 are inserted to constitute cores for molding holes in the molded insulating base. Alternatively, and in accordance with my present invention, cores may be formed as an integral part of the mold-cavity plate. FIG. 13 is a diagram showing a process of making two mating mold-cavity plates with integral cores on one plate and mating pads therefore on the other plate. As shown in the partial section at the bottom of FIG. 13, a lower mold-cavity plate 100 may have a land 102 for molding a conductor channel, and this land may carry key-forming projections 104, similar to the projections 41 of the mold of FIG. 7. Extending up from the land 102 is an integral core 106 that meets against a surface or pad 108 on a land 110 on an upper mold-cavity plate 112. The mold may have several such cores.

In FIG. 13, for forming the lower mold-cavity plate 100, a film 116 carries a transparent image 118 of the conductor portion of one side of the final circuit board, and a less transparent, preferably opaque, image 120 of the nonconducting portion of the circuit pattern. The film 120 and a half-tone screen 122 are laid over a light sensitive photographic film 124 and exposed to light for printing on the film 124, a pattern of dots filling the area of the conductor image 118. This image on the film 124 is developed and used for printing on a film sheet 126 an image like that on the sheet 120 but with the half-tone pattern in the light area.

The sheet 126, and also a similar but opaque sheet 128, are punched with the same pattern of holes. For example, they may be punched in the same press setup indicated by the pair of punches 130. These holes mark the positions of a pair of cores, such as core 106.

Figure 17:
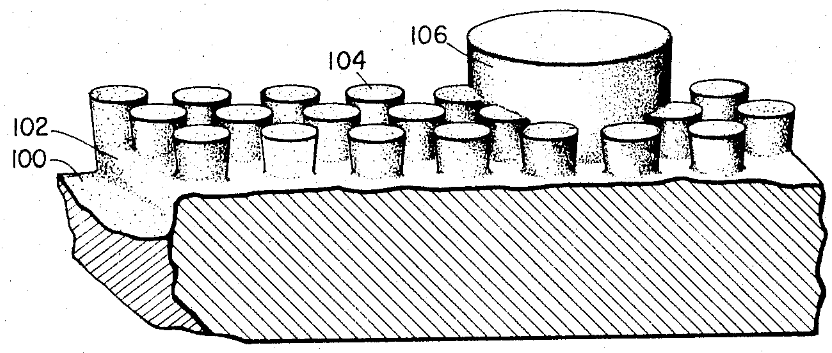
FIG. 17 is an enlarged, partial perspective view of a mold-cavity plate with a core produced by the processes of FIGS. 13, 14, 15 and 16.

In a step of the process shown at 131, a layer of photo-resist 132 on a metal mold plate blank 134 is exposed through the two holes in the sheet 128. After the exposed photo-resist is developed and hardened, the blank 134 is etched for producing the two cores 106 as shown at step position 133. A second coating of photo-resist 129 is applied to the blank 134 and cores 106 and, as shown at step 135, the punched sheet 126 is laid over the blank 134 with the holes of the sheet 126 receiving the cores 106 so that the sheet 126 lies flat on the etched surface of the blank 134. This assembly is then exposed to light so that the half-tone circuit pattern of the sheet 126 produces a pattern of dots on the blank 134. This resist is developed and hardened and the plate is etched as previously described in connection with FIG. 3. Because the resist covers the cores 106, they are not altered by this etch. The core 106 and key-forming projections 104 are now as shown at step 137. "Dragon's Blood" is applied as described in connection with FIGS. 4 and 5 and the plate is further etched to produce the lands 102 as shown at step 139. The land 102, key projections 104 and core 106 may then appear as shown in FIG. 17. Certain dimensions, such as the length of the key projections and their spacings, and the thickness of metal removed by the etching, are exaggerated in these views. The key projections 104, though shown round, may have other shapes.

Similarly, also in FIG. 13, for making the upper mold-cavity plate 112, a film 136, having the image of the circuit pattern thereof, is printed through a half-tone screen 138 to produce a reverse image 140 which, in turn, is printed at 142 for producing the conductor pattern in half-tone. This film 142 is punched for the core positions with the same hole spacing as the sheets 126 and 128 as, for example, in the same punch 130. The punched film 142 is turned over, and its pattern, including the holes, is printed into a layer of resist 144 of a mold plate blank 146 as shown at step 143. The light passing through the half-tone pattern produces an array of dots in the conductor area, except that the light passing through the punched holes produces a solid area of resist. Etching as previously described then produces the key projections 111 at step 145 and the land 110 at step 147, leaving the unetched surface 108 which is to mate with the top of the core 106 as shown at the bottom of FIG. 13.

It is to be noted that the top of the core 106 and the mating face 108 are both unetched surfaces, so that at these positions the thickness of each mold cavity plate is equal to the original thickness of the blank. Consequently, if a single plate has several cores they can all be made to meet the mating faces 108.

Figure 14:
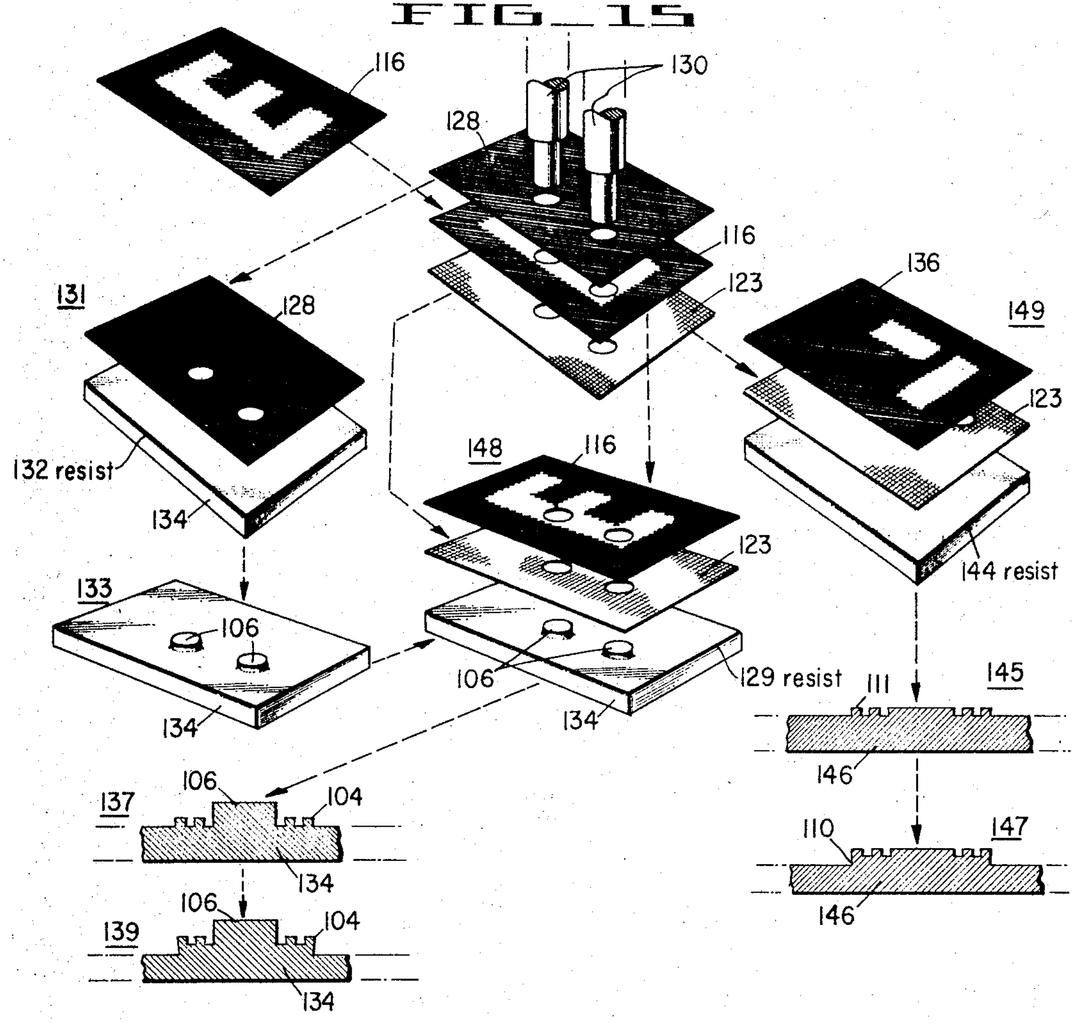

Alternatively, the mold cavity plates 100 and 112 of FIG. 13 may be produced by the process diagrammed in FIG. 14. There the film 116, with the image of the circuit pattern thereon, is perforated in the punch 130. This perforated sheet is then similar to the perforated sheet 126 in FIG. 13 except that the conductor area lacks the half-tone pattern. Accordingly, a half-tone screen 123 is also perforated, and after steps 131 and 133, which are the same here in FIG. 13, both the perforated conductor image 116 and the perforated half-tone screen are placed over the resist 129 on the blank 134 at step 148 with the perforations of the two sheets fitting over the cores 106. The perforated half-tone sheet 123, FIG. 14, is also used with the image pattern 136 at step 149 for exposing the resist 144 on the blank 146 for producing on the resist 144 an array of dots in the conductor pattern, except that the area corresponding to the core will be completely covered with resist. In all other respects, the method of FIG. 14 is the same as that of FIG. 13.

Figure 15:
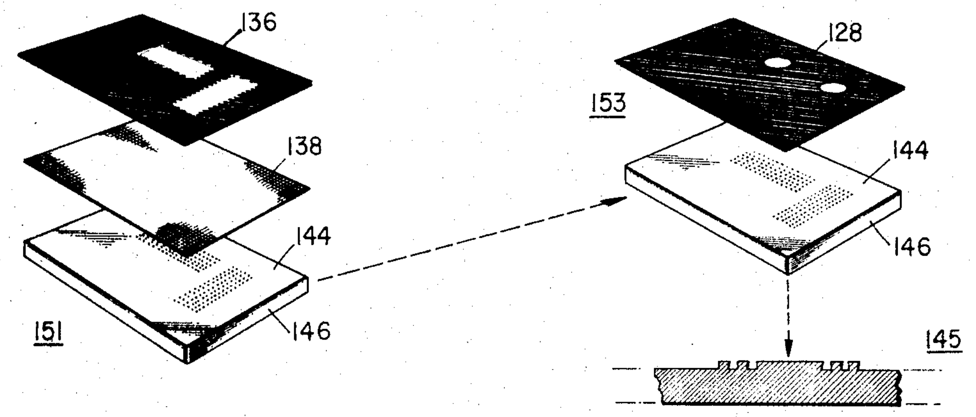

FIG. 15 depicts another modification of the method of FIG. 13. There the film 136 containing the image of the conductor pattern for the upper mold cavity plate 112, is laid over the half-tone screen 138 and the two laid over the coating of photo-resist 144 on the mold plate blank 146. This is exposed to light at step 151 but is not immediately developed or hardened. Then at step 153 an opaque sheet with perforations at the core positions, such as sheet 128 from FIG. 13, is laid over the previously exposed but still undeveloped layer of resist 144 on the blank 146 and exposed to light. This action exposes the resist in the core positions and overprints the half-tone there. The resist is then developed and hardened. The blank 146 is then etched as at step 145 in the process in FIG. 13, and finished as the mold-cavity plate 100.

Figure 16:
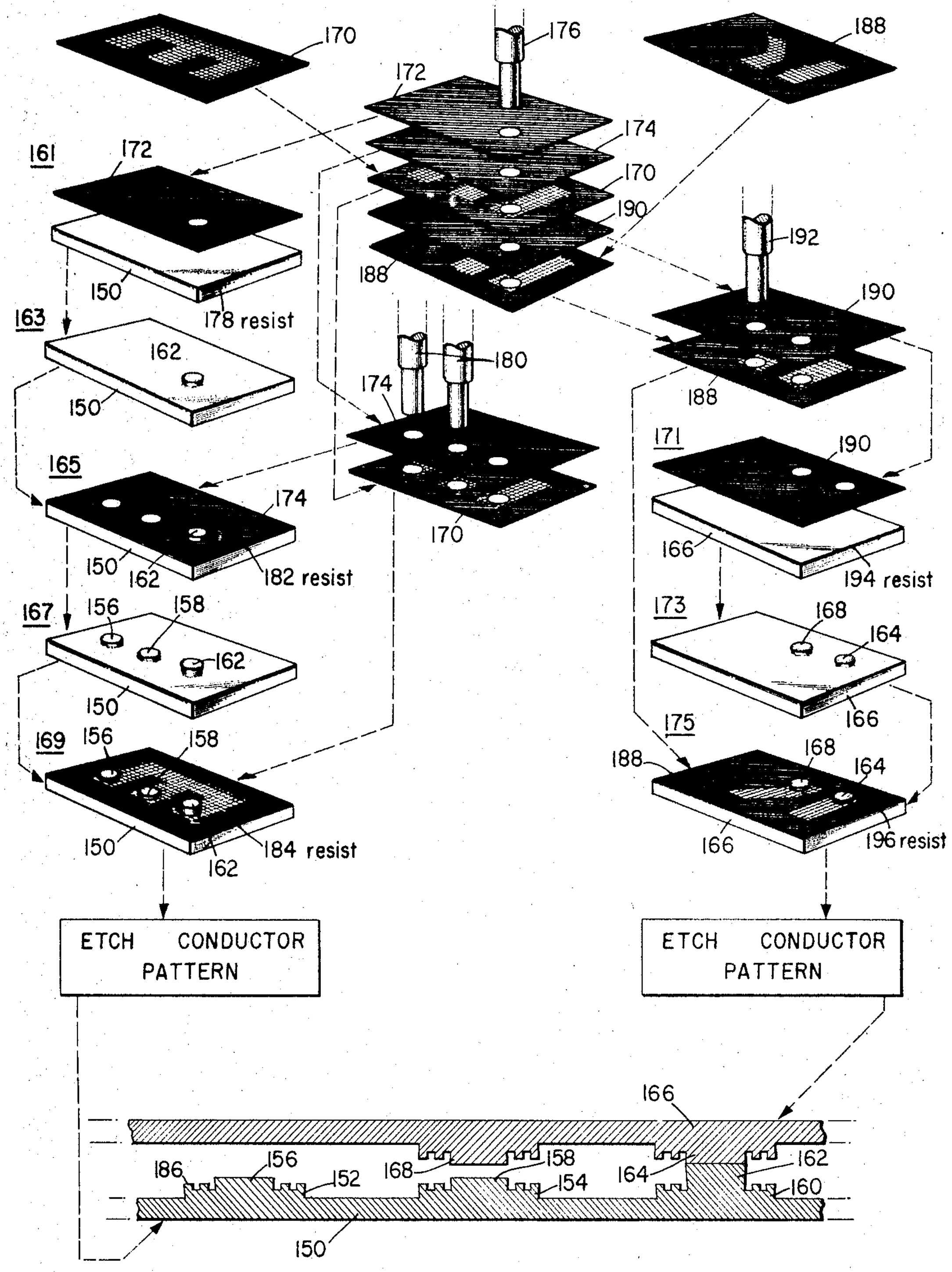

The pins 56 and 58 of FIG. 7 and the core 106 of FIGS. 13 and 14 produce holes extending through the molded circuit board base. It is also desirable to provide blind holes, that is, holes not extending completely through the board. Such blind holes may provide additional anchorage for the conductors or may provide extra thickness of metal for sliding contacts. In FIG. 16, at the lower portion thereof is shown a lower mold-cavity plate 150 having lands 152 and 154 for molding conductor channels in the insulating base. Extending from these lands are cores 156 and 158 for molding blind holes. The mold-cavity plate 150 also has a land 160 on which is a somewhat taller core 162 which abuts a core 164 on upper mold-cavity plate 166 for molding a hole through the board. The upper mold-cavity plate 166 also includes a core 168 for a blind hole, and conveniently, the cores 164 and 168 may extend the same distance. However, if preferred, through-holes may be formed by the meeting of two taller cores, such as the core 162. For making the mold-cavity plates 150, a film 170 has a half-tone image of the circuit pattern. This film may be prepared similarly to the film 126 of FIG. 13. This film 170, and also two opaque sheets 172 and 174, are punched by a punch 176 at the position of the core 162 for the through-hole (bottom of FIG. 16). The punched opaque sheet 172 is used at step 161 for producing a resist coating only in the position of the hole in a resist layer 178 on the metal plate 150 which, at this stage, is a mold plate blank. The blank 150 is etched at step 163 for producing a partial core 162.

The second opaque sheet 174, and also the film 170 with the half-tone image of the circuit pattern, each having a hole made by punch 176, are punched by a punch 180 at the positions of the two cores 156 and 158 (bottom of FIG. 16) which are to form the blind holes. At step 165, a resist coating 182 is applied to the blank 150 and partial core 162. The punched opaque sheet 174 is then laid over the blank 150 with the hole corresponding to the long core laid over the partial core 162. The other two holes pass light to cause a resist layer to be developed at the positions of the other two cores. The resist layer 182 is also developed on the partial core 162. The plate 150 is further etched at step 167 for leaving the two cores 156 and 158 and increasing the height of the core 162. At step 169, resist 184 is again applied to the blank 150 and the cores. The sheet 170, carrying the half-tone image of the circuit pattern and having three holes punched at the three core positions, is laid over the plate 150 with the three holes fitting over the three cores 156, 158 and 162 for producing a resist layer 184 in the circuit pattern. The plate is then etched as described in connection with FIGS. 3, 4, 5 and 6 for producing the key-forming projections 186 and the lands 152, 154 and 160.

For the upper mold-cavity plate 166, a film 188 having the half-tone circuit pattern and also an opaque sheet 190, are punched in the press 176 at the through-hole position and are then punched in a press 192 at the position of the core 168 for the blind hole. The punched opaque sheet 190 is used at step 171 for photographically producing the pattern of the two holes on the layer of resist 194 on the mold plate blank 166. The plate is then etched at step 173 to produce the two cores 164 and 168. At step 175, another layer of resist 196 is applied to the blank 166 including the cores 164 and 168, and the punched film 188 is laid over the blank with the holes fitting over the cores. The resist is then exposed and developed for the circuit pattern, and the plate is etched for producing the key-forming projections and the lands for the conductor channels as previously described.

It is to be noted that the end faces of the through-core 162 and the core 164, which it meets, are original unetched surfaces of the mold plate blank 150, so that if several such through-holes are needed in a board, their respective cores can be of essentially the same height to facilitate proper mating. Conveniently, one plate, in this instance plate 166, has only short cores, and long cores are provided on the other plate for through-holes. However, if it is desired, each through-hole may be molded by two long cores which meet, and in that case, both plates may be made by the process depicted in FIG. 16 for the plate 150.

FIGS. 18 to 22 show a construction for a conductor that terminates near the edge of a circuit board for making connection with a plug-in receptacle. FIG. 18 shows a molded insulating base 200 having a conductor channel 202, undercut at 204, and having keys, or keying holes, 206. This conductor channel terminates close to the edge 208 of the insulating base in a blind hole 210 which is undercut at 212 and 213. A similar channel is on the other side of the base 200. FIGS. 19, 20 and 21 show the base 200 with conductors 216 and 218 formed therein, as by electroplating and grinding as described hereinbefore. As shown in FIG. 22, the board and conductor may be beveled at 220 and 222 for facilitating the insertion of the board into engagement with spring contacts 224 of a receptacle. Preferably, the bevel extends into the conductor a short distance to ensure that the spring contact 224 will be off the insulator when the board is in place in the receptacle.

FIG. 23 illustrates the versatility of my invention and process, and their adaptability to bases of any form. There, a molded base of insulating material, such as polysulfone or PPO, has the form of an open box, the interior of which has molded projections and contours 72 and 74 for holding components. The interior 76 of the base 70 can be coated with wax or other antiplating material so that metal will not plate thereon, and other surfaces, such as the sides 78, may be similarly coated. After plating and grinding, the base will have circuit conductors, such as 80 and 82.

FIGS. 24 and 25 show a circuit board base having a conductor deposited thereon that is sufficiently thin that it does not fill the keying holes, or pockets, in the bottom of the conductor channel but rather simply lines those holes or pockets. In FIG. 24, a base 230 has a conductor 232 formed thereon, as by electroplating as herein described. This conductor covers the outer surface of the base and lines the keying holes 234 in one continuous sheet of metal. A connecting lead 236 is soldered to the conductor 232 by mass of solder 238 which, as is well-known, is flowed into position. The solder 238 fills the pockets in the conductor 232 for increasing their rigidity and thereby increasing the security of the fastening of the conductor 232 to the base 230 at the position of the terminal connection.

The convolutions of the conductor, particularly the pocket-like portions 234, enable the conductor 232 to maintain continuity of the circuit even when severely strained. As shown in FIG. 25, if the conductor 232 is elongated, the stress in the sheet portion will cause a rupture 242, but this rupture occurring at the narrow section will cut across the openings 240 of the keying holes 234, and as the elongation continues, a rupture will extend at 244 down into the pocket-like portion 234. This rupture will split two opposite sides of the cup-like portion 234, but the other two sides of the cup and the bottom will maintain the continuity of the electric circuit. While this action of maintaining the circuit in spite of rupture is described here as taking place in a thin conductor, I have found that it occurs also when the conductor is sufficiently thick that it substantially closes the opening, such as 240 in FIG. 25.

In all views, the size of the key-forming projections on the molds, the heights of the lands that mold the conductor channels, the heights of the cores on the mold platen, the corresponding dimensions on the molded insulating base, and the thickness of the metal conductors, are exaggerated to aid the disclosure.

The embodiments herein shown and described are illustrative of my invention, which is limited only to the scope of the following claims.

I claim:

1. The steps in a method of forming a base of a base-and-conductor assembly for an electric circuit module which comprises forming on a surface of a mold blank a coating of etch-resist material in a pattern of closely spaced dots covering an area that corresponds to a conductor area of the circuit module, etching said surface of the blank for removing a layer of the material thereof from the area between the dots, but within said conductor area, and from the areas next to, but outside, said conductor area to render a plurality of closely spaced projections, applying an etch-resist material between said projections of said conductor area and again etching said surface for removing additional material thereof from the areas next to, but outside, said conductor area to render a common relief area, thereby leaving a raised projection-containing conductor area, subsequently molding an insulating base in a mold cavity, the face of which includes said surface of said blank by causing insulating material to flow into and around said projections in the conductor areas and onto said relief areas and by causing said insulating material to solidify, and removing said base from said mold cavity for exposing the conductor cavities and closely-spaced recesses therein that were molded in said base by the raised conductor areas and closely-spaced projections of said etched blank.

2. The method of claim 1 wherein the last recited etching step is controlled for undercutting said conductor areas.

3. The steps in a method of forming a base-and-conductor assembly for an electric circuit module comprising:

forming on a surface of a mold blank, a coating of etch-resist material in a pattern of closely spaced dots covering an area that corresponds to a conductor area of the circuit module, etching said blank for removing material of said surface of the blank from the portion between the resist-coated dots and from the area next to, but outside, said conductor area to render a plurality of closely spaced projections, applying additional etch-resist material to the conductor area including the flanks of said projections and further etching said surface for removing additional material of the blank from the area next to, but outside, said conductor area to render a common relief area, thereby leaving a raised projection-containing conductor area, subsequently molding an insulating base in a mold cavity the face of which includes said surface of said blank by causing insulating material to flow into and around said projections in the conductor areas and onto said relief areas and by causing said insulating material to solidify, removing said base from said mold cavity for exposing the conductor cavities and closely-spaced recesses therein that were molded in said base by the raised conductor areas and closely-spaced projections of said etched blank, and forming metal conductors in said molded conductor cavities of said base with integral projections extending into said recesses.

4. The steps in a method of forming a base of a base-and-conductor assembly for an electric circuit module comprising:

forming on a surface of a mold blank a coating of etch-resist material in a pattern of closely spaced dots covering an area that corresponds to a conductor area of the circuit module, etching said surface of the blank for removing the material thereof to a first depth between the resist-coated dots, but within said conductor area and in the area next to, but outside of, said conductor area to render a plurality of closely spaced projections, removing additional material of the blank from said surface next to, but outside of, said conductor area to render a common relief area, thereby leaving a raised projection-containing conductor area, applying additional etch-resist material to the flanks of said projections and to the flanks of said raised conductor area, again etching said blank for removing material thereof next to, but outside, said raised conductor area, subsequently molding an insulating base in a mold cavity the face of which includes said surface of said blank by causing insulating material to flow into and around said projections in the conductor areas and onto said relief areas and by causing said insulating material to solidify, and removing said base from said mold cavity for exposing the conductor cavities and closely-spaced recesses therein that were molded in said base by the raised conductor areas and closely-spaced projections of said etched blank.

5. The process of claim 4 wherein the last recited etching step is controlled for undercutting said conductor area.

6. The process of claim 3 wherein the last recited two steps of applying resist and of etching are repeated, and are controlled for undercutting said conductor area.

7. The steps in a method of forming a base-and-conductor assembly for an electric circuit module comprising:

forming on a surface of a mold blank a coating of etch-resist material in a pattern of closely spaced dots covering an area that corresponds to a conductor area of the circuit module, eaching said surface of the blank for removing the material thereof to a first depth between the resist-coated dots, but within said conductor area and in the area next to, but outside of, said conductor area to render a plurality of closely spaced projections, applying additional etch-resist material to the conductor area including the flanks of said projections in the conductor area and further etching said surface for removing additional material thereof from the area next to, but otuside of said conductor area to render a common relief area, thereby leaving a raised projection-containing conductor area, applying etch-resist material to the flanks of the projecting conductor area and again etching said surface for removing additional material thereof from said relief area next to, but outside, said conductor area to further relieve said relief area, thereafter molding an insulating base in a mold cavity the face of which includes said surface of said blank by causing insulating material to flow into and around said projections in the conductor areas and onto said relief areas and by causing said insulating material to solidify, removing said base from said mold cavity for exposing the conductor cavities and closely-spaced recesses therein that were molded in said base by the raised conductor areas and closely-spaced projections of said etched blank, and forming metal conductors in said molded conductor cavities of said base with integral projections extending into said recesses.

References Cited

UNITED STATES PATENTS

| | | | |
|---|---|---|---|
| 1,954,403 | 4/1934 | Daly. | |
| 2,474,988 | 7/1949 | Sargrove | 29—626 |
| 2,695,351 | 1/1960 | Beck. | |
| 3,042,591 | 7/1962 | Cado | 204—15 |
| 3,217,089 | 11/1965 | Beck | 174—68.5 |

FOREIGN PATENTS

| | | |
|---|---|---|
| 993,984 | 6/1965 | Great Britain. |

JOHN F. CAMPBELL, *Primary Examiner.*

R. W. CHURCH, *Assistant Examiner.*

U.S. Cl. X.R.

29—527, 530, 627; 156—3; 174—68.5; 264—220, 272